United States Patent [19]

Neukermans et al.

[11] Patent Number: 5,895,866
[45] Date of Patent: Apr. 20, 1999

[54] MICROMACHINED SILICON MICRO-FLOW METER

[76] Inventors: Armand P. Neukermans, 3510 Arbutus Ave., Palo Alto, Calif. 94303; Timothy G. Slater, 1032 Irving St., San Francisco, Calif. 94122

[21] Appl. No.: 08/786,534

[22] Filed: Jan. 21, 1997

Related U.S. Application Data

[60] Provisional application No. 60/010,386, Jan. 22, 1996.

[51] Int. Cl.$^6$ .............................. G01F 1/28; G01N 11/00
[52] U.S. Cl. ...................................................... 73/861.74
[58] Field of Search .......................... 73/861.71, 861.74, 73/849, 720, 726, 204.26

[56] References Cited

U.S. PATENT DOCUMENTS

| | | | |
|---|---|---|---|
| 2,632,329 | 3/1953 | Zuehlke | 73/861.74 |
| 3,380,299 | 4/1996 | Seymour | 73/186 |
| 3,424,000 | 1/1969 | Chelner et al. | 73/228 |
| 3,857,277 | 12/1974 | Moore | 73/28 |
| 4,317,611 | 3/1982 | Petersen | 350/6.6 |
| 4,468,282 | 8/1984 | Neukermans | 156/633 |
| 4,598,585 | 7/1986 | Boxenhorn | 73/505 |
| 4,670,092 | 6/1987 | Motamedi | 156/643 |
| 4,699,006 | 10/1987 | Boxenhorn | 73/517 |
| 4,732,440 | 3/1988 | Gadhok | 350/6.6 |
| 4,869,107 | 9/1989 | Murakami | 73/517 |
| 4,942,766 | 7/1990 | Greenwood et al. | 73/704 |
| 5,016,072 | 5/1991 | Greiff | 357/26 |
| 5,111,693 | 5/1992 | Grieff | 73/514 |
| 5,131,265 | 7/1992 | Tobin et al. | 73/54.23 |
| 5,189,918 | 3/1993 | Etienne et al. | 73/861.75 |
| 5,202,785 | 4/1993 | Nelson | 359/214 |
| 5,203,208 | 4/1993 | Bernstein | 73/505 |
| 5,220,835 | 6/1993 | Stephan | 73/517 R |
| 5,251,485 | 10/1993 | Kondo | 73/517 R |
| 5,331,852 | 7/1994 | Greiff et al. | 73/505 |
| 5,559,291 | 9/1996 | Hasegawa | 73/504.02 |
| 5,579,148 | 11/1996 | Nishikawa et al. | 359/214 |
| 5,663,508 | 9/1997 | Sparks | 73/861.71 |

OTHER PUBLICATIONS

Boxenhorn, B., et al., "Monolithic Silicon Accelerometer." *Sensors and Actuators*, A21–A23 (1990) pp. 273–277.

Breng, U., et al., "Electrostatic Micromechanic Actuators," *Journal of Micromechanics and Microengineering*, 2 (1992) pp. 256–261.

Buser, R.A., et al., "Very High Q-factor Resonators in Moncrystalline Silicon," *Sensors and Actuators*, A21–A23 (1990) pp. 323–327.

Diem, B., et al., "SOI (SIMOX) as a Substrate For Surface Micromachining of Single Crystalline Silicon Sensors and Actuators," *The 7th International Conference on Solid–State Sensors and Actuators*, (1993) pp. 233–236.

Jaecklin, V.P., et al., "Mechanical and Optical Properties of Surface Micromachined Torsional Mirrors in Silicon, Polysilicon and Aluminum", *The 7th International Conference on Solid–State Sensors and Actuators*, (1993) pp. 948–961.

Kleiman, R.N., et al., "Single-Crystal Silicon High-Q Torsional Oscillators," *Rev. Sci. Instum.* 56(11), Nov. 1985, pp. 2088–2091.

Pfann, W.G., et al., "Semiconducting Stress Transducers Utilizing the Transverse and Shear Piezoresistance Effects," *Journal of Applied Physics*, vol. 32, No. 10, (1961) pp. 2008–2016.

(List continued on next page.)

*Primary Examiner*—Harshad Patel
*Attorney, Agent, or Firm*—Donald E. Schreiber

[57] ABSTRACT

A micromachined, monolithic silicon flow meter includes a vane 28 from which projects a hinge. The hinge is provided by torsion bars 24. The hinge supports the vane 28 for rotation about the torsion bars 24. A deflection sensor, consisting of a torsion sensor 42, incorporated into at least one of the torsion bars 24, senses deflection of the vane 28 responsive to fluid impinging thereupon. The frame 22, the torsion bars 24, the vane 28 and the torsion sensor 42 are all monolithically fabricated in a semi-conductor single-crystal silicon layer of a substrate.

15 Claims, 8 Drawing Sheets

OTHER PUBLICATIONS

Wagner, B., et al., "Electromagnetic Microactuators with Multiple Degrees of Freedom," *1991 International Conference on Solid–State Sensors and Actuators,* Digest of Technical Papers. (IEEE Cat. No. 91CH2817–5) pp. 614–617.

Petersen, K., "Silicon Torsional Mirror," *Proceedings of the IEEE* vol. 70, No. 5 (1982), pp. 61–62.

Gass, V. et al., "Nanofluid Handling by Micro–Flow–Sensor Based on Drag Force Measurements," Proceedings of the IEEE Micro–Electronics Mechanical Systems Conference (1993), pp. 167–172.

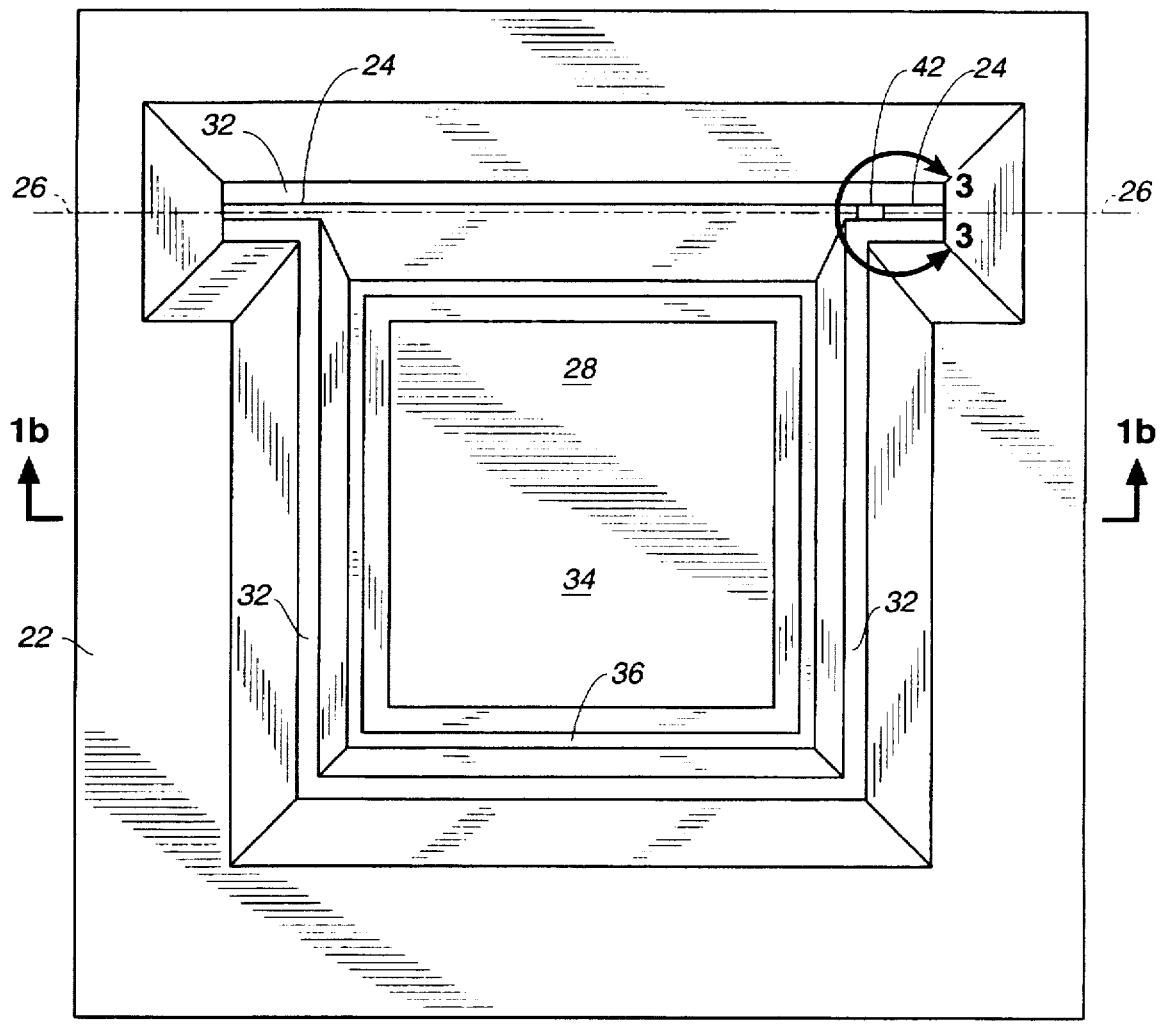
FIG._1a
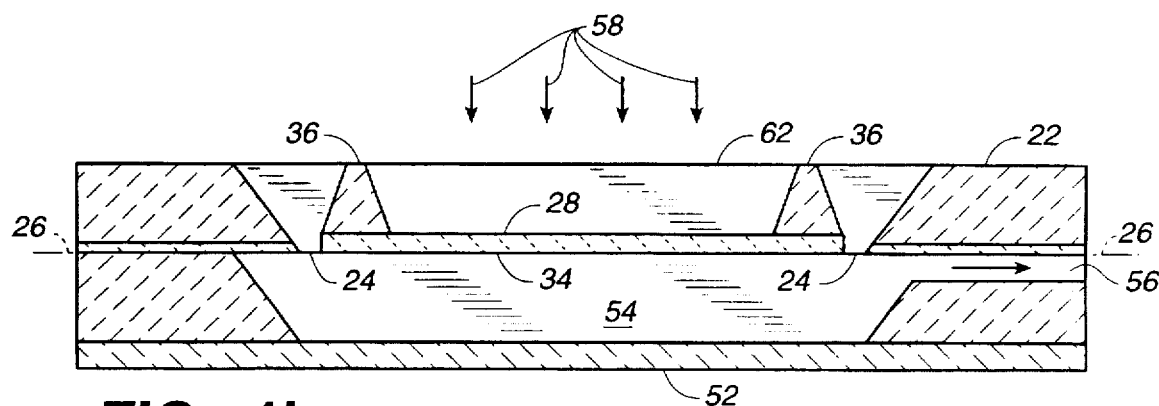
FIG._1b

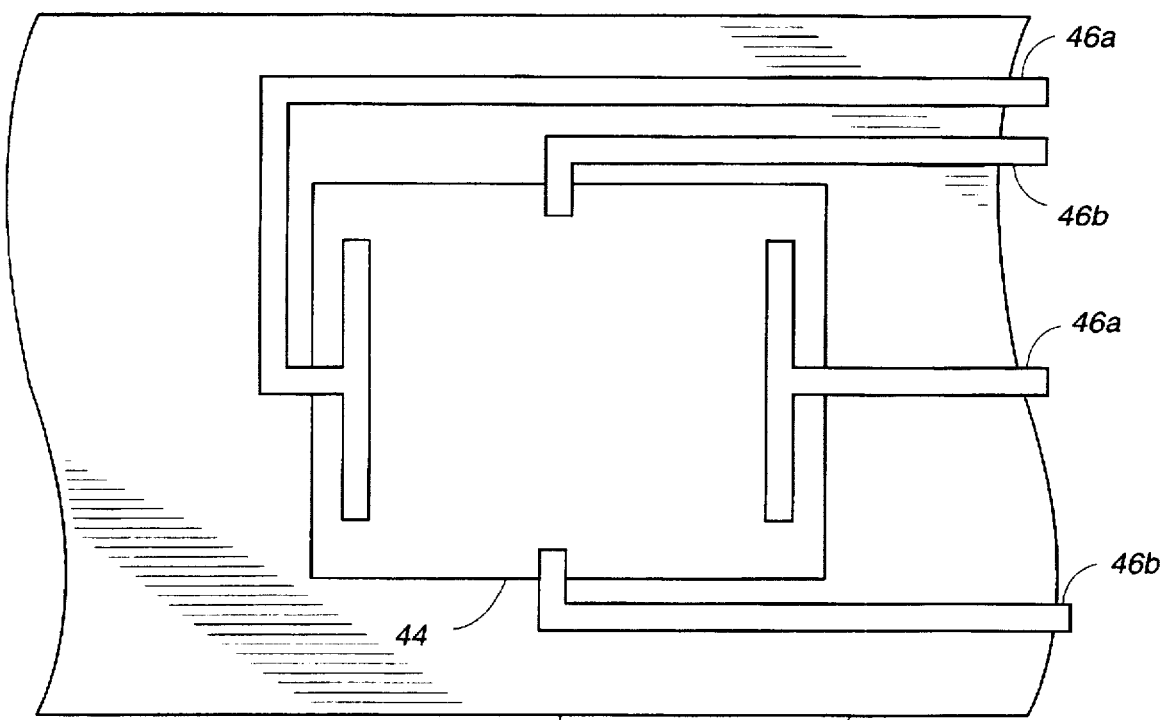
FIG._3
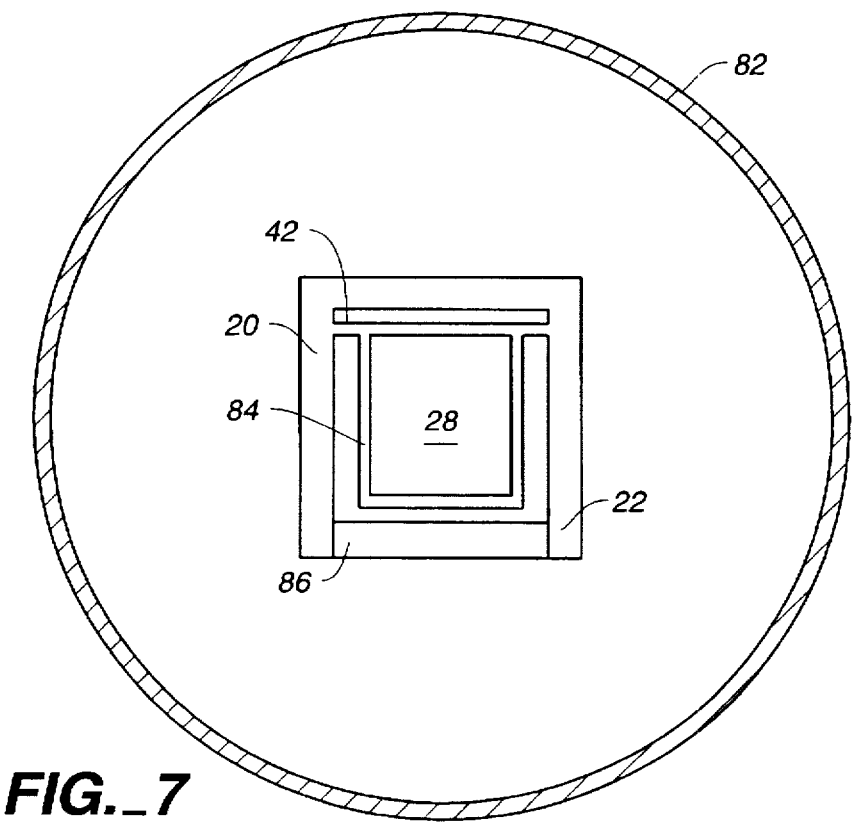
FIG._7

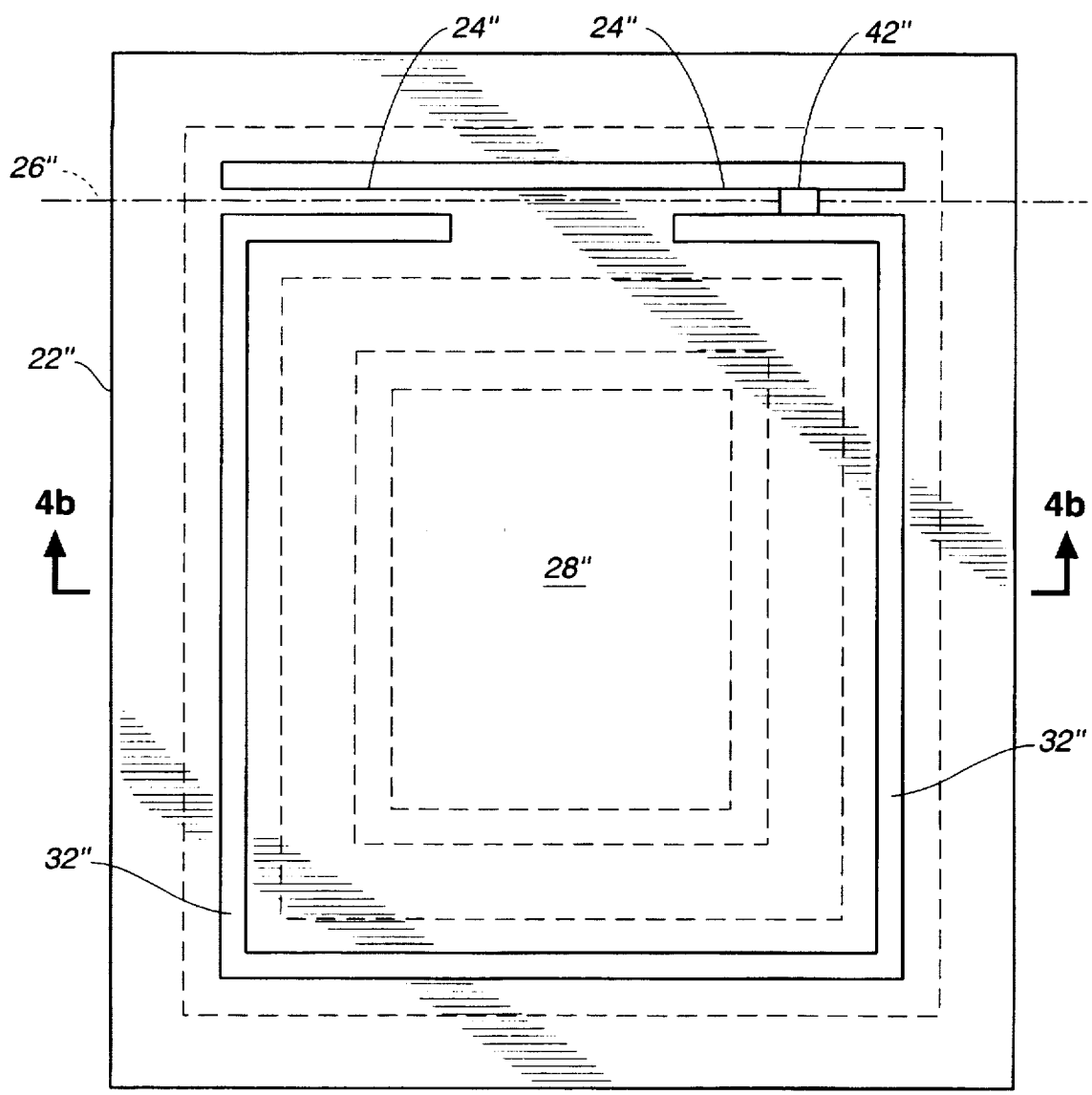
FIG._4a
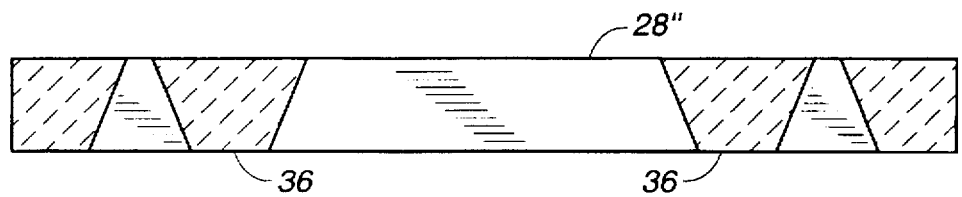
FIG._4b

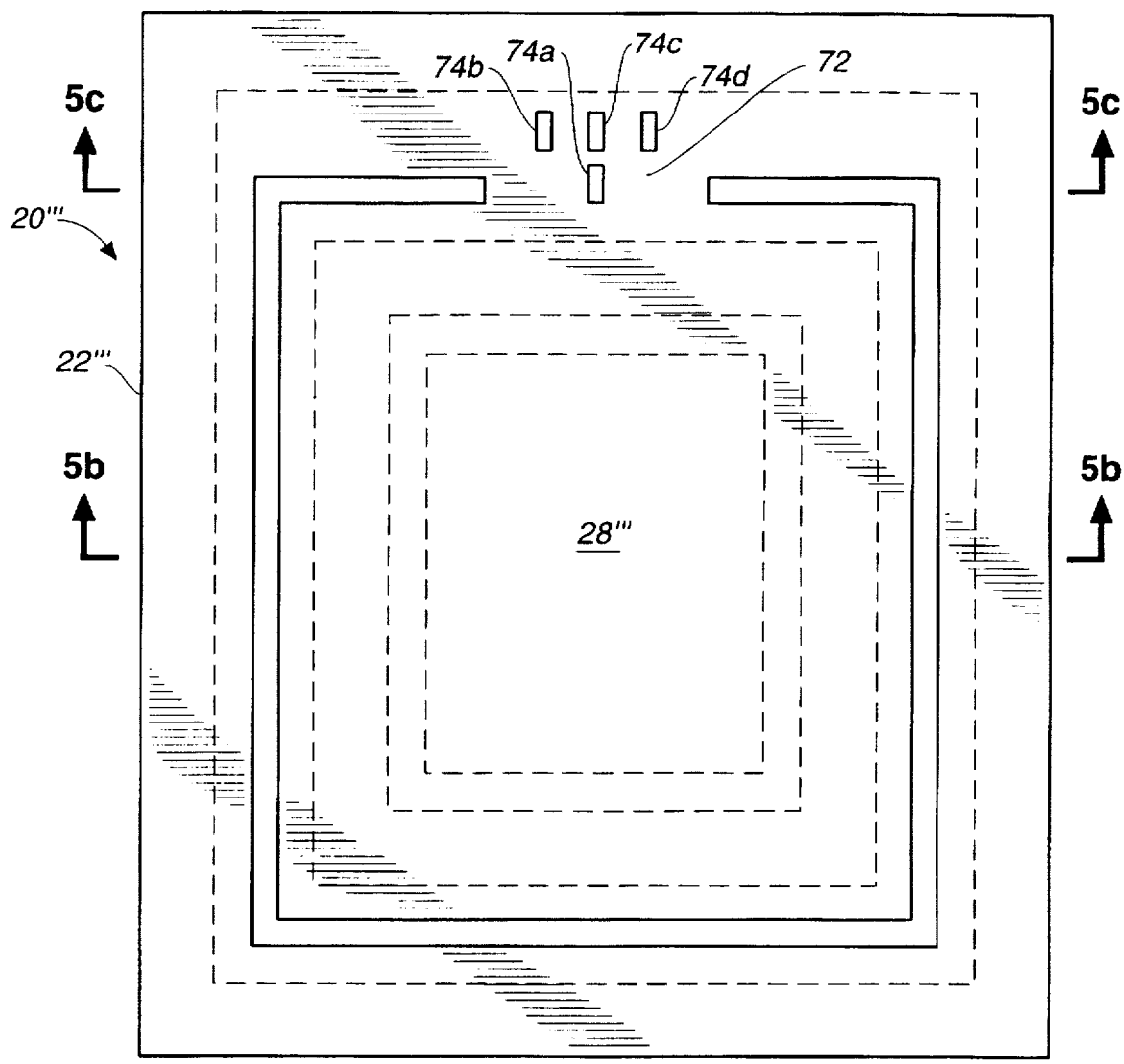
FIG._5a
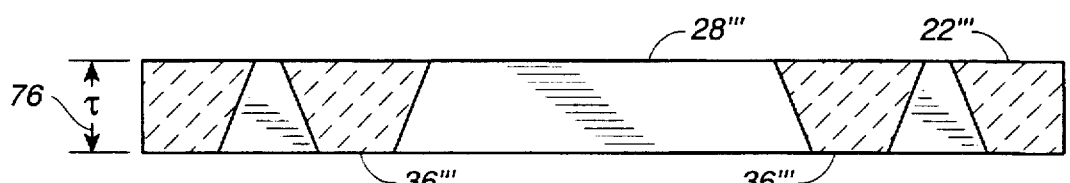
FIG._5b
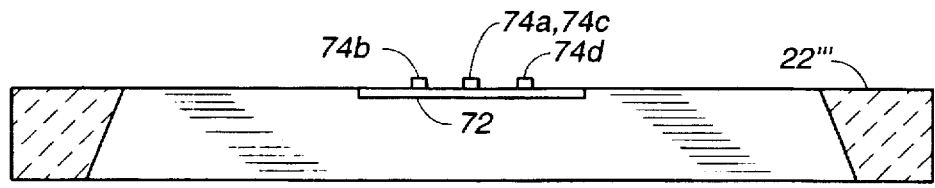
FIG._5c

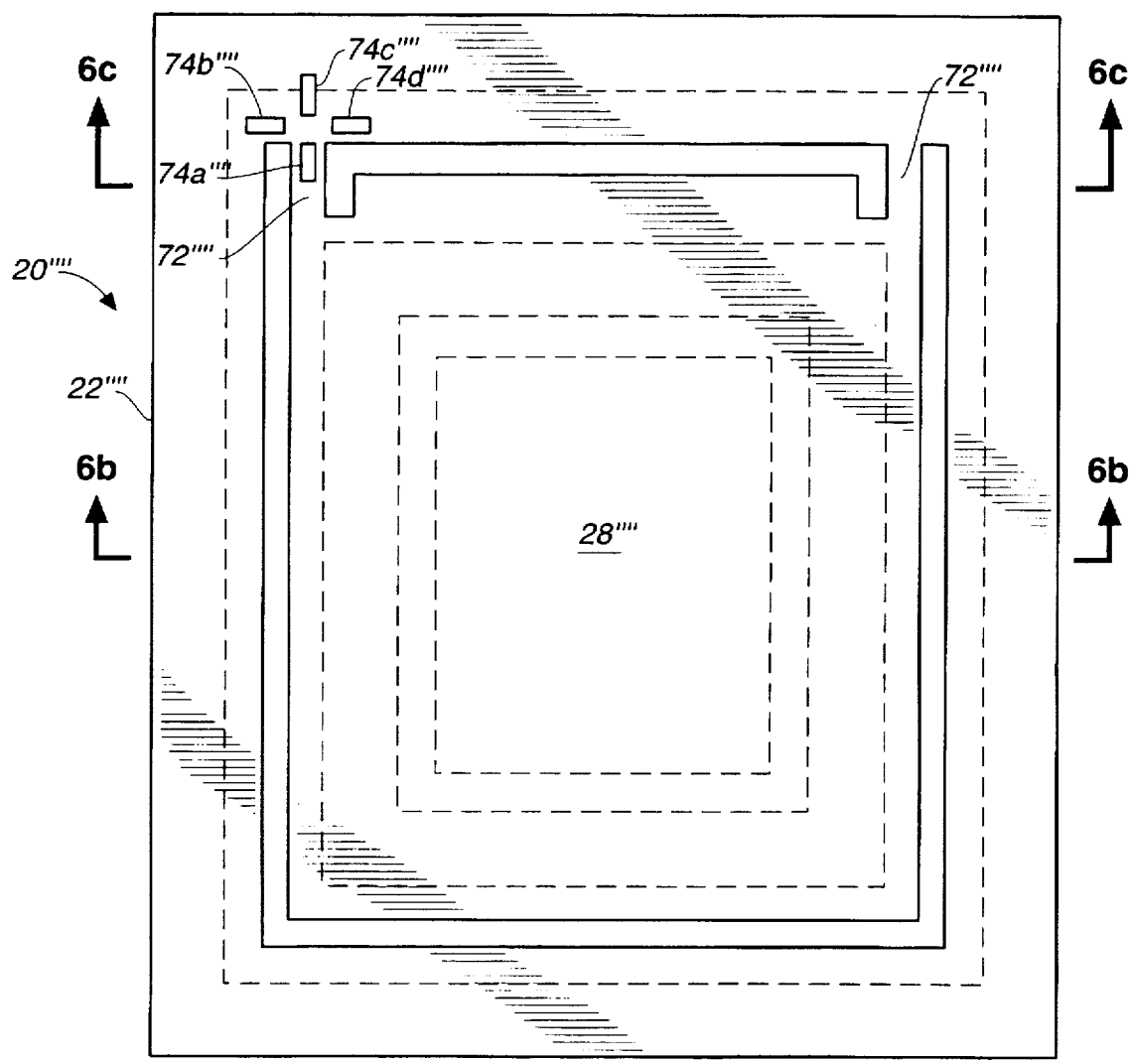
FIG._6a
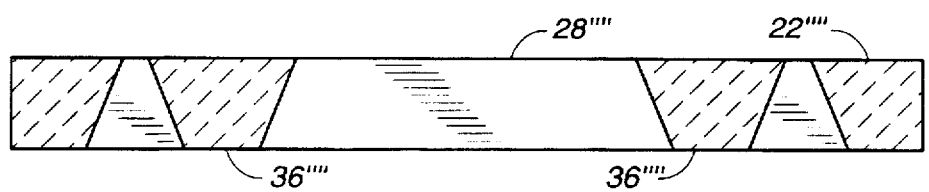
FIG._6b
FIG._6c

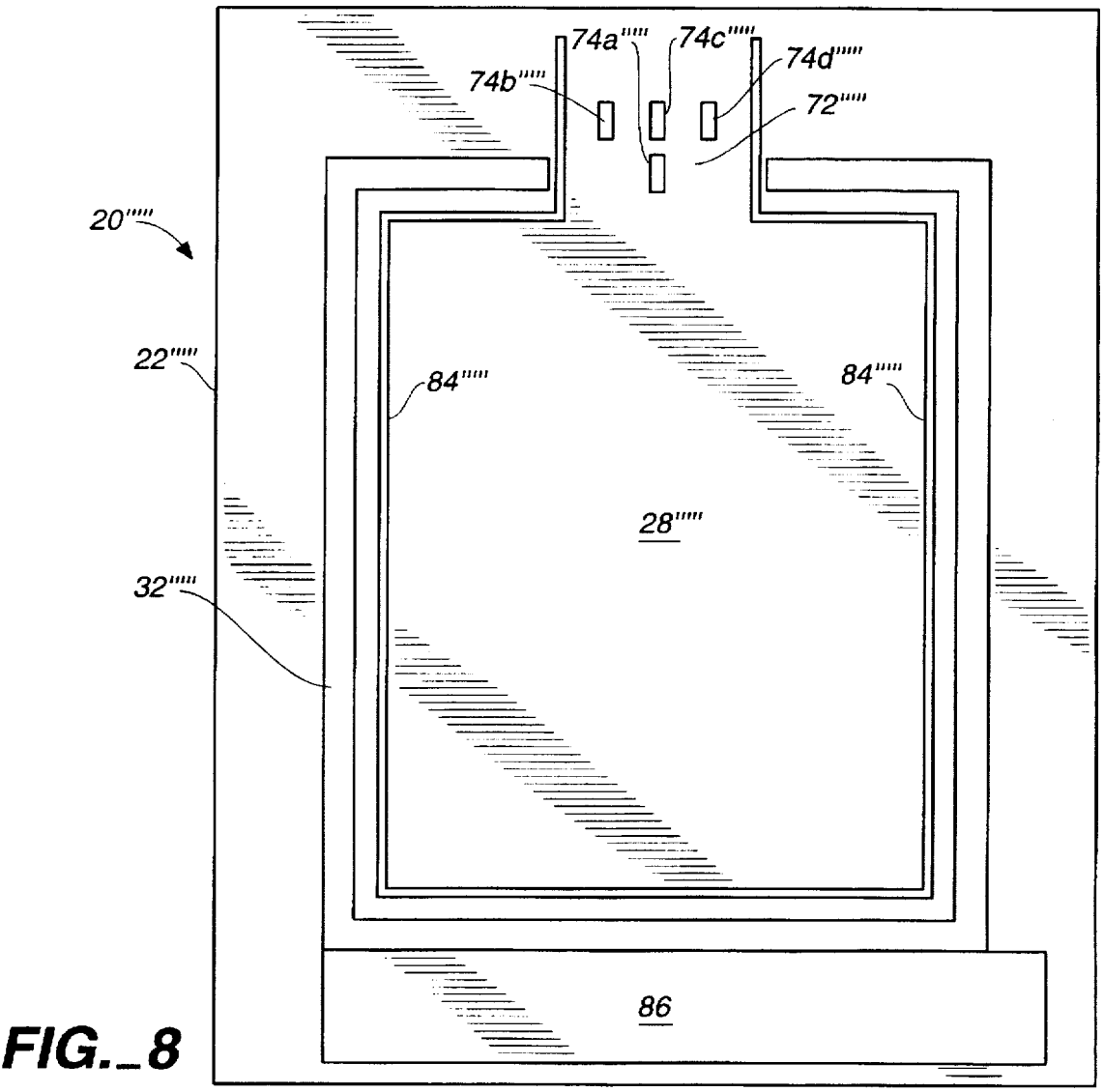
FIG._8
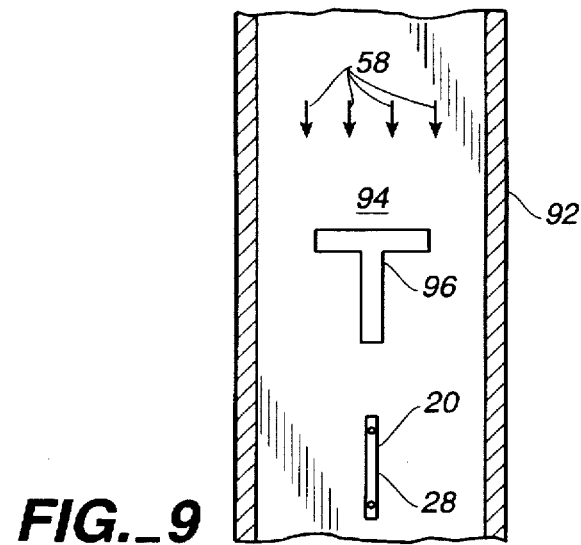
FIG._9

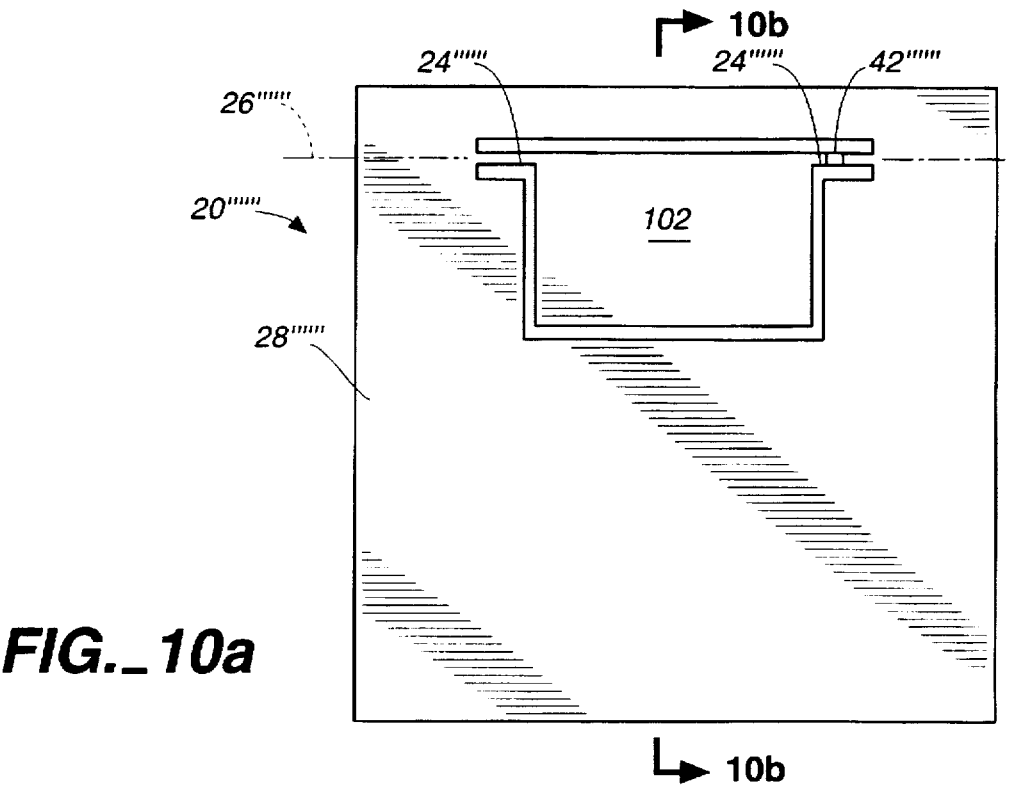
FIG._10a
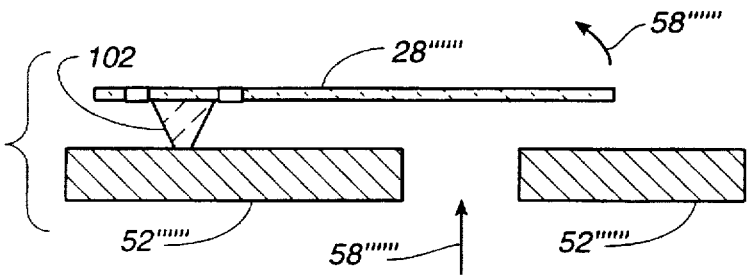
FIG._10b
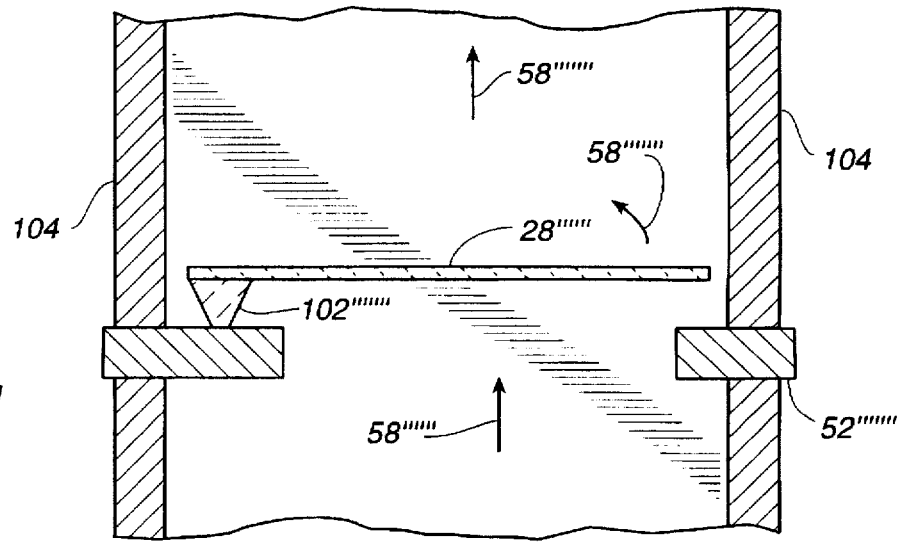
FIG._11

MICROMACHINED SILICON MICRO-FLOW METER

CLAIM OF PROVISIONAL APPLICATION RIGHTS

This application claims the benefit of U.S. Provisional Patent Application No. 60/010,386 filed on Jan. 22, 1996.

BACKGROUND OF THE INVENTION

1. Field of the Invention

This invention relates to the field of fluid flow measurement and, more particularly, to miniaturized flow meters capable of measuring flow rates of tens to hundreds of microliters/minute ("μl/min").

2. Description of the Prior Art

In many fields, the measurement of small fluid flows is extremely important. Particularly in the fields of biological, medical sciences, analytical instrumentation, and drug delivery, the measurement of extremely small quantifies of fluids for dosimetry or titration, either of liquids or for gases, is a common problem. Frequently the quantity of fluid to be measured is almost in the nanoliter range. Often it is desirable, especially to avoid contamination in medical tests, that the flow meter be disposable and hence of low cost. Absolute accurate measurements are not always necessary, but precise and repeatable measurements are. For many of these applications, traditional flow meters, scaled down to smaller geometries, are infeasible. For example, flow meters that employ a pressure measurement principle become very difficult to implement.

An article by Gass, V., van der Schoot, B. H., and de Rooij, N. F. entitled "Nanofluid Handling by Micro-Flow-Sensor Based on Drag Force Measurements," published in the Proceedings of the IEEE Micro-Electronics Mechanical Systems conference held in Fort Lauderdale, Fla. during 1993, IEEE Catalog no. 93CH3265-6 ("the Gass article"), discloses a micro-flow-sensor for liquids that operates over a flow range extending from 5 microliters/minute ("μl/min") to 500 μl/min. The micro-flow-sensor described in the Gass article employs a cantilevered beam that carries piezo-resistors arranged to form a Wheatstone bridge. Under laminar flow conditions, with a low Reynolds number, the force due to the pressure difference in the liquid on opposite sides of the cantilevered beam is negligible. However, liquid flowing past a free end of the cantilevered beam, and that flow's associated drag on the end of the beam due to viscous shear in the liquid, bends the beam and thereby stresses the piezo-resistors making up the Wheatstone bridge.

SUMMARY OF THE INVENTION

An object of the present invention is to provide a flow meter for measuring minute fluid flows.

Another object of the present invention is to provide an inexpensive flow meter for measuring minute fluid flows.

Yet another object of the present invention is to provide a flow meter for measuring minute fluid flows that is easy to manufacture.

Yet another object of the present invention is to provide a flow meter for measuring minute fluid flows that is economical to manufacture.

Yet another object of the present invention is to provide a flow meter for measuring minute fluid flows which is simple.

Yet another object of the present invention is to provide a flow meter for measuring minute fluid flows which is reliable.

The present invention is a micromachined, monolithic silicon vane-type flow meter for measuring very small flows. The flow meter includes an outer frame from which inwardly projects a hinge. A vane, which the hinge joins to and supports from the frame, is disposed in a rest position with respect to the frame if no external force is applied to the vane. The hinge permits deflection of the vane from the rest position by a torque applied to the vane such as fluid flowing through the flow meter. The flow meter also includes a deflection sensing means for sensing deflection of the vane from the rest position. The frame, hinge, vane and deflection sensing means are all monolithically fabricated in a semiconductor single-crystal silicon layer of a substrate.

In a preferred embodiment of the flow meter, the hinge is formed by opposing torsion bars that are aligned along a common axis for supporting the vane within the frame. The torsion bars support the vane within the frame for rotation about the common axis of the torsion bars. In this embodiment, the deflection sensing means is integrated into at least one of the torsion bars for generating a torsion signal that indicates deflection of the vane from the rest position. The sensor integrated into the torsion bar is inexpensive and is very sensitive. An alternative embodiment of the flow meter employs a flexure hinge, whose bending is sensed by a piezo-resistive bridge. In either embodiment, fluid impacting upon the vane, or dynamic or flow pressure on the vane, either urges the vane to rotate about the torsion bars' common axis, or bends the flexure hinge.

These and other features, objects and advantages will be understood or apparent to those of ordinary skill in the art from the following detailed description of the preferred embodiment as illustrated in the various drawing figures.

BRIEF DESCRIPTION OF THE DRAWINGS

FIG. 1a is a plan view illustrating a preferred embodiment of the micromachined, vane-type flow meter using a torsion bar hinge to support the vane within a frame, and having a sensor integrated into the torsion bar;

FIG. 1b is a cross-sectional elevational view illustrating the preferred embodiment of the flow meter using a torsion bar hinge and sensor integrated into the torsion bar taken along the line 1b—1b in FIG. 1a;

FIG. 2b is a cross-sectional elevational view illustrating the alternative embodiment of the flow meter taken along the line 2b—2b in FIG. 2a;

FIG. 3 is a plan view illustrating a four-terminal torsion sensor that is integrated into the torsion bar taken along the line 3—3 in FIG. 1a;

FIG. 4a is a plan view illustrating an alternative embodiment of the torsion bar hinge and vane of the flow meter which provides for a better match to etching geometries;

FIG. 4b is a cross-sectional elevational view illustrating the alternative embodiment of the torsion bar hinge and vane of the flow meter taken along the line 4b—4b in FIG. 4a;

FIG. 5a is plan view illustrating an embodiment of the flow meter in which a central flexure hinge, that incorporates a piezo-resistive bridge arrangement, supports and senses deflection of the vane;

FIG. 5b is a cross-sectional elevational view illustrating the embodiment of the flow meter having a central flexure hinge that incorporates the piezo-resistive bridge taken along the line 5b—5b of FIG. 5a;

FIG. 5c is a cross-sectional elevational view illustrating the embodiment of the flow meter having a central flexure hinge that incorporates the piezo-resistive bridge taken along the line 5c—5c of FIG. 5a;

FIG. 6a is a plan view illustrating an alternative embodiment of the flow meter having a spaced-apart pair of flexure hinges that incorporates a piezo-resistive bridge arrangement for measuring bending into at least one of the flexure hinges;

FIG. 6b is a cross-sectional elevational view illustrating the embodiment of the flow meter having a spaced-apart pair of flexure hinges that incorporates a piezo-resistive bridge arrangement taken along the line 6b—6b of FIG. 6a;

FIG. 6c is a cross-sectional elevational view illustrating the embodiment of the flow meter having a spaced-apart pair of flexure hinges that incorporates a piezo-resistive bridge arrangement taken along the line 6c—6c of FIG. 6a;

FIG. 7 is a cross-sectional view of a large diameter tube that has a flow meter supported at the center of the tube thereby adapting the flow meter for measuring a flow rate for larger volume lows using a force-feedback technique;

FIG. 8 is a plan view depicting an alternative embodiment of the central flexure hinge flow meter depicted in FIG. 5a that is adapted for directly measuring flow rate using the force-feedback technique employed for the larger volume flow meter depicted in FIG. 7;

FIG. 9 is a cross-sectional view of a "vortex shedding" flowmeter that may incorporate any of the flow-meters depicted respectively in FIGS. 1a, 1b; 4a, 4b; 5a, 5b, 5c; 6a, 6b and 6c;

FIG. 10a is a plan view of an alternative embodiment vane-type flow meter in which the vane surrounds a central mounting pillar;

FIG. 10b is a cross-sectional view of the alternative embodiment flow meter in which the vane surrounds a central mounting pillar taken along the line 10b—10b in FIG. 10a; and FIG. 11 is a cross-sectional view of the alternative embodiment flow meter in which the vane surrounds a central mounting pillar adapted for sensing the flow rate of a larger volume flow.

DETAILED DESCRIPTION OF THE PREFERRED EMBODIMENT

Figure 2A:
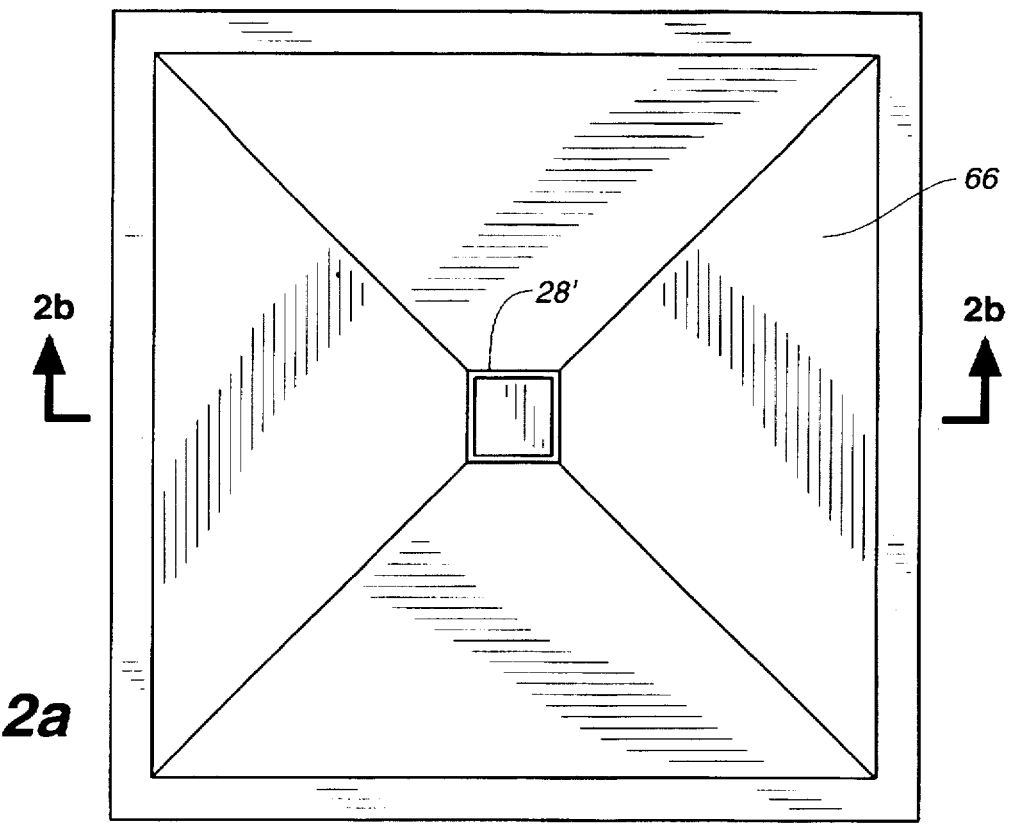
FIG. 2a is a plan view illustrating an alternative embodiment of the micromachined flow meter that is provided with a symmetrically shaped inlet and outlet.

FIGS. 1a and 1b illustrate a preferred embodiment of the micromachined flow meter referred to by the general reference character 20. The flow meter 20 includes an outer frame 22 from which inwardly projects a pair of opposing torsion bars 24. The torsion bars 24 are aligned along a common axis 26 for supporting a vane 28 in a rest position illustrated in FIG. 1b. A gap 32 separates the vane 28 from the encircling frame 22 except where the torsion bars 24 join the vane 28 to the frame 22, and the vane 28 is shaped asymmetrically with respect to the common axis 26 of the torsion bars 24. However, in principle, torsion bars 24 need not be located at one edge of the vane 28 as depicted in FIG. 1a, but may be more symmetrically located. In general, the gap 32 between the vane 28 and the frame 22 is made as small as possible to avoid leakage and loss of flow meter sensitivity. The gap 32, as narrow as a few microns, may be easily fabricated using micromachining. The torsion bars 24, functioning as hinges, support the vane 28 within the frame 22 for rotation with respect to the frame 22 about the common axis 26 of the torsion bars 24.

The frame 22, torsion bars 24 and vane 28 are all monolithically fabricated from a semiconductor single-crystal silicon layer of a substrate wafer. When using a common [100] oriented silicon wafer, the torsion bars 24 are preferably oriented along the [100] crystallographic direction, or the [110] crystallo-graphic direction. The physical properties of the torsion bars 24 in relationship to the vane 28 are those described in U.S. patent application Ser. No. 08/139,397 filed Oct. 18, 1993, entitled "Micromachined Torsional Scanner." This ensures that the vane 28 rotates about the common axis 26 upon application of a torque. The flow meter 20 is generally fabricated using SOI (Silicon on Insulator) type silicon wafers, such as Simox or bonded wafers as described in the patent application identified above. Such a substrate provides a natural etch stop in the process of fabricating the flow meter 20, a good definition for the vane 28, and stress-free, single crystal torsion bars 24 which are essential to the functioning of the flow meter 20. Reactive ion etching or wet etching can be used to define the vane 28. The torsion bars 24 and a central portion 34 of the vane 28 are made from the top silicon on the SOI wafer, similar to scanner fabrication described in the patent application identified above. The vane 28 may be formed from the full thickness of the substrate, or the bulk of the silicon may be removed from the backside of the substrate by aniso-tropic etching leaving a pyramidally-shaped, box-shaped reinforcing frame 36 encircling the perimeter of the central portion 34 of the vane 28.

At least one of the torsion bars 24 carries a torsion sensor 42, a four-terminal version of which is illustrated in greater detail in FIG. 3. The torsion sensor 42 is of the type described both in U.S. patent application Ser. No. 08/139,397 identified above, and in U.S. Pat. No. 5,488,862 entitled "Monolithic Silicon Rate-Gyro With Integrated Sensors" which issued on Feb. 6, 1996, both of which were filed by the inventors of the present application. Both the patent application and issued patent are hereby incorporated herein by reference.

As described in the patent application and patent identified above, the orientation of the torsion bars 24 is along the [100] direction if the active material of the sensor is p-type silicon, or in the [110] direction if the active torsion sensor material is n-type. The torsion sensor 42 is located in diffused or implanted region 44 within the torsion bar 24. The torsion sensor 42 preferably has two pairs of metallic sensor leads 46a and 46b which make ohmic contact with the implanted region 44, and which are elsewhere insulated from the torsion bar 24 and from the frame 22. The sensor leads 46a and 46b terminate on the frame 22 in individual torsion sensor pads, not illustrated in any of the FIGs. The torsion sensor pads permit bonding or soldering the sensor leads 46a and 46b to external leads, also not illustrated in any of the FIGs. An electric current is applied to the torsion sensor 42 through a pair of leads 46a, and a sensor output voltage is measured between a pair of leads 46b. The implanted region 44 restrains the electric current to the top surface of the torsion bar 24 so the electric current is used optimally for sensing twisting of the torsion bar 24. The sensor output voltage appearing across leads 46b is proportional to the current flowing between leads 46a, and the rotational-position of the vane 28 about the common axis 26 of the torsion bars 24 with respect to the frame 22. The torsion sensor 42 can resolve very small rotations, on the order of a microradian, and can be thermally compensated as known in the art.

The torsion bars 24 may be hardened by conversion of a surface layer thereof into silicon carbide or silicon nitride. The torsion sensor 42 may be also overcoated with dielectrics such as oxides or nitrides, or polymers, to isolate the torsion sensor 42 electrically from the fluid if so desired. If the torsion sensor 42 is partially overlapped by the underlaying silicon support, then the oxide is preferentially etched out sideways from underneath the torsion sensor 42, to permit the torsion bars 24 to freely rotate. For use with liquids, the flow meter 20 may be coated with a wetting agent to avoid entrapping gases. The flow meter 20 may also be operated in a vertical orientation, with the hinge at the bottom. Such an orientation for the flow meter 20 helps remove trapped gas bubbles if any are present.

Referring again to FIGS. 1a and 1b, the flow meter 20 is bonded or otherwise glued or attached to a support base 52, possibly also made out of silicon or glass. The support base 52 includes a cavity 54 large enough to accommodate the vane 28 when deflected by pressure applied to the vane 28 by fluid flowing through the flow meter 20. One or more ports 56, only one of which is illustrated in FIG. 1b, vent fluid from the flow meter 20. The sensor leads 46a and 46b for the torsion sensor 42 may pass between the frame 22 and the juxtaposed support base 52. In principle, the support base 52 may be made from any material suitable for attachment to the frame 22, such as a plastic material. Thus the support base 52 need not be made from silicon.

Operation of the flow meter 20 is, in principle, identical to a macroscopic vane flow meter. With no fluid flow, the vane 28 is undeflected, and the output voltage from the torsion sensor 42 is zero. When a flow of fluid, indicated by arrows 58 in FIG. 1b, passes through the flow meter 20, the vane 28 deflects downward into the cavity 54 thereby rotating around the common axis 26 of the torsion bars 24. As a result, the torsion sensor 42 produces an output voltage on the leads 46b that is related to how fast the fluid is flowing through the flow meter 20. The output signal produced by the torsion sensor 42 is not necessarily linearly related to the flow rate, but the relationship is unique. Because the torsion sensor 42 in the torsion bar 24 is extremely sensitive, very good resolution and repeatability can be obtained. The output signal from the torsion sensor 42 on the leads 46b is bipolar. Thus, the output signal of the torsion sensor 42 reverses if the vane 28 deflects away from the cavity 54 rather than into the cavity 54. An alternating current ("AC") may be applied across the leads 46a which causes the electrical signal produced by the torsion sensor 42 on the leads 46b to become a modulation envelope of the applied AC thereby removing any direct current ("DC") offset. If AC is applied to the torsion sensor 42, the modulated AC signal present on the leads 46b reverses phase if the vane 28 deflects away from the cavity 54 rather than toward the cavity 54. Regardless of whether a direct current ("DC") or AC current is applied to the torsion sensor 42, the relationships between fluid flow rate and the output signal produced by the torsion sensor 42 if the vane 28 is deflected in opposite directions are not necessarily identical.

Figure 2B:
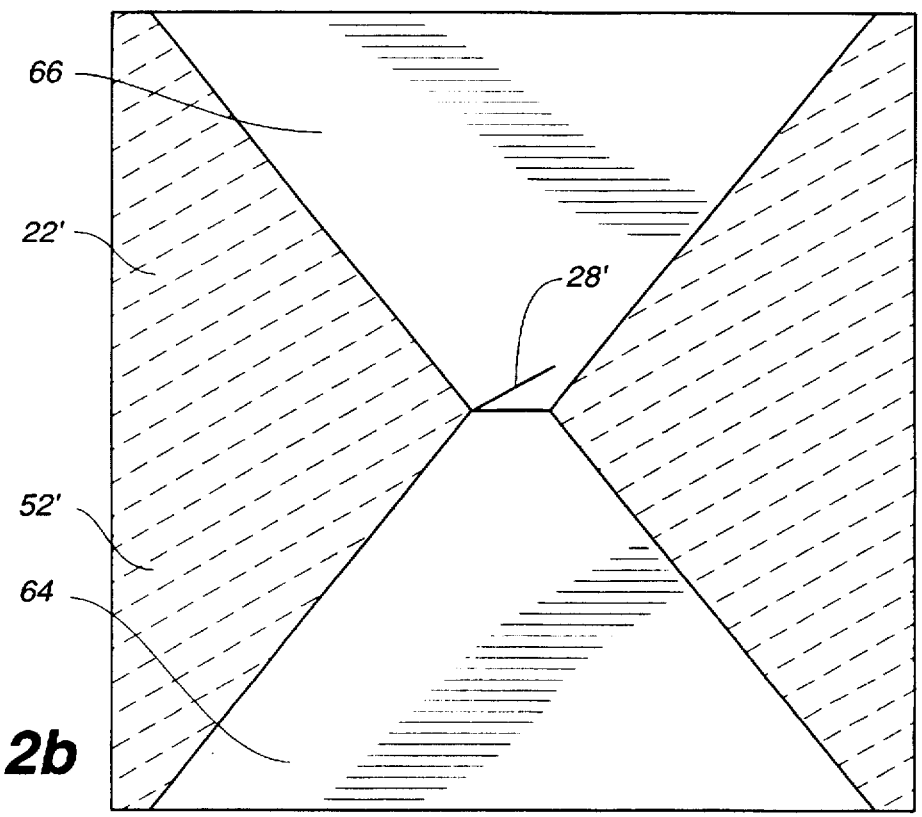

FIGS. 2a and 2b respectively depict plan and cross-sectional elevational views of a slightly different embodiment of the flow meter 20. In the embodiment depicted in FIGS. 2a and 2b, both an inlet 64 and outlet 66 of the flow meter 20 are shaped symmetrically. Those elements depicted in FIGS. 2a and 2b that are common to the flow meter 20 depicted in FIGS. 1a and 1b carry the same reference numeral distinguished by a prime (" ' ") designation. The embodiment depicted in FIGS. 2a and 2b is readily fabricated from silicon by anisotropic etching. Again, the frame 22' may be attached to the support base 52' by standard silicon bonding techniques, or they may simply be glued together.

An alternative configuration for the vane 28 and torsion bars 24 is illustrated for the alternative embodiment of the flow meter 20 depicted in FIGS. 4a and 4b. Those elements depicted in FIGS. 4a and 4b that are common to the flow meter 20 depicted in FIGS. 1a and 1b carry the same reference numeral distinguished by a double prime (" " ") designation. The torsion bars 24" depicted in FIGS. 4a and 4b are re-entrant in that both of the torsion bars 24" extend for some distance along one edge of the vane 28". This shape for the vane 28" and the torsion bars 24" including the torsion sensor 42" now fits within a simple rectangular area in the frame 22". This configuration for the vane 28" and the torsion bars 24" fits better to the anisotropic etching geometries which may be used for the support base 52. As before, for best and most sensitive operation, the gap 32" between the frame 22" and vane 28" is made as narrow as practicable. The vane 28" may or may not include the pyramidally shaped reinforcing frame 36" encircling the perimeter of the central portion 34" of the vane 28", or the vane 28" may equal the full thickness of the wafer substrate, not illustrated in any of the FIGs.

FIGS. 5a, 5b and 5c depict another alternative embodiment of the flow meter 20. Those elements depicted in FIGS. 5a, 5b and 5c that are common to the flow meter 20 depicted in FIGS. 1a and 1b carry the same reference numeral distinguished by a triple prime (" ''' ") designation. In the embodiment depicted in FIGS. 5a, 5b and 5c, the vane 28''' is attached by a flexure hinge 72 to the frame 22'''. The flexure hinge 72 simply bends, rather than twisting as the torsion bars 24. The stresses in the flexure hinge 72 caused by bending are sensed in the flow meter 20''' depicted in FIGS. 5a, 5b and 5c by a four terminal, piezo-resistor Wheatstone bridge as is known in the art. Accordingly, the flow meter 20''' includes at least one piezo-resistor 74a located on the flexure hinge 72, and three compensating piezo-resistors 74b, 74c and 74d located elsewhere on the flow meter 20'''. The piezo-resistors 74a–74d are interconnected on the frame 22''' to form a Wheatstone bridge. Stretching or compression of the piezo-resistor 74a due to bending of the flexure hinge 72 unbalances the Wheatstone bridge. Note that the flow meter 20''' may or may not include the reinforcing frame 36'''.

FIGS. 6a, 6b and 6c depict an alternative embodiment of the flow meter 20''' illustrated in FIGS. 5a, 5b and 5c. Those elements depicted in FIGS. 6a, 6b and 6c that are common to the flow meter 20''' depicted in FIGS. 5a, 5b and 5c carry the same reference numeral distinguished by a quadruple prime (" '''' ") designation. The flow meter 20'''' depicted in FIGS. 6a, 6b and 6c replaces the central flexure hinge 72 of the embodiment depicted in FIGS. 5a, 5b and 5c with two symmetrically located flexure hinges 72'''' that attach the vane 28'''' to the frame 22''''. Again, at least one of the flexure hinges 72'''' carries the piezo-resistor 74a'''' while the flow meter 20'''' carries the piezo-resistors 74b'''', 74c'''' and 74d''''. Both flexure hinges 72'''' may include the piezo-resistor 74a'''', and the signals the pair of piezo-resistors 74a'''' may be combined to cancel parasitic effects. Regardless of whether the flow meter 20'''' includes one or two piezo-resistors 74a'''', the piezo-resistor 74a'''' produces an electrical signal responsive to stress in the flexure hinge 72'''' created by bending of the flexure hinge 72''''. Similar to the embodiment of the flow meter 20''' depicted in FIGS. 5a, 5b and 5c, the piezo-resistors 74a''''–74d'''' are interconnected to form a Wheatstone Bridge, and the vane 28'''' may include or omit the reinforcing frame 36.

FIG. 7 depicts an adaptation of the flow meter 20 for measuring larger volume flows in which the flow meter 20 is supported at the center of a large diameter external tube 82. Most of the fluid flowing through external tube 82 bypasses the flow meter 20, but pressure across the flow meter 20 applies a deflecting force to the vane 28. For the application of the flow meter 20 depicted in FIG. 7, the vane 28 is preferably maintained in its undeflected rest position, for example by supplying an electric current through a coil 84 formed on the vane 28 that lies in a magnetic field established by a permanent magnet 86 mounted on the frame 22. The output signal from the torsion sensor 42 depicted in FIG. 7 (or the Weatstone bridge formed by the piezo-resistors 74a–74d for the flexure hinge 72) is employed in a feedback circuit located externally to the flow meter 20 to establish a force-feedback operating mode for the flow meter 20. The force-feedback operating mode maintains the vane 28 in its undeflected rest position. Operating in such a force-feedback mode, the electric current passing through the coil 84 measures the rate at which fluid flows past the flow meter 20.

Omitting the external tube 82, FIG. 8 depicts an alternative embodiment of the flow meter 20''' depicted in FIG. 5a, 5b and 5c that is adapted for using the force-feedback principle in measuring minute flow rates. Those elements depicted in FIG. 8 that are common to the flow meter 20''' depicted in FIGS. 5a, 5b and 5c and to the flow meter 20 depicted in FIG. 7 carry the same reference numeral distinguished by a quintuple prime (" ''''' ") designation. In the alternative embodiment of the flow meter 20''''' depicted in FIG. 7, the gap 32''''' between vane 28''''' and frame 22''''' is deliberately enlarged to provide a passage for fluid flowing through the flow meter 20'''''. Similar to the flow meter 20 depicted in FIG. 7, the vane 28''''' is maintained in its undeflected rest position against the static pressure of flowing fluid by forces resulting from a magnet field established by the permanent magnet 86''''' and electric current flowing through the coil 84'''''. The signal from the piezo-resistors 74a–74d is supplied to an external feed-back circuit which supplies the electric current to the coil 84''''' which maintains the vane 28''''' in its undeflected rest position. The flow meter 20''''' illustrated in FIG. 8 uses the flexure hinge 72''''', but can, of course, also be fabricated with the torsion bars 24. If the forces applied to the vane 28''''' by fluid flowing past the flow meter 20''''' through the gap 32''''' are substantial, then a permanent magnet may be mounted on the vane 28''''', and a magnetic field established by an electromagnet external to the flow meter 20''''' may be used to maintain the vane 28''''' in its undeflected rest position. The size of the vane 28''''' can be adjusted with respect to the gap 32''''' to match the forces applied to the vane 28''''' by fluid flowing through the flow meter 20''''' with the forces applied to the vane 28''''' by the permanent magnet and the electromagnet.

Thus far two different classes of micromachined vane-type flow meters have been described, those which employ torsion bars 24 for supporting the moveable vane 28, or those which employ the flexure hinge 72 for supporting the moveable vane 28. In connection with both classes of flow meters, the moving vane 28 has been described as being oriented to obstruct the fluid flowing through the flow meter 20. Impeding at least part of the fluid flow in this way applies forces to the vane 28 which causes it either to twist the torsion bars 24, or to bend the flexure hinge 72 thereby producing an electrical signal either in the torsion sensor 42 or in the piezo-resistors 74a–74d. Depending upon a particular application for the flow meter 20, it becomes necessary to select a particular size for the vane 28 and for the gap 32 which tailors the flow meter 20 so the torsion sensor 42 or the piezo-resistors 74a–74d produce a signal which accurately measures flow rate over the anticipated range of minimum and maximum flow rates. Also, in some applications, movement of the vane 28 responsive to fluid flowing through the flow meter 20 affects the rate of fluid flow slightly, resulting in a non-linear flow rate vs. pressure relationship across the flow meter 20.

In addition to an orientation in which the vane 28 obstructs fluid flow through the flow meter 20, another orientation for the flow meter 20 exists in which the vane 28 is oriented substantially parallel to the flowing fluid. With the vane 28 oriented substantially parallel to the flowing fluid, the flow meter 20 may operate as a so-called a "vortex shedding" flow meter. FIG. 9 is a cross-sectional diagram depicting such a "vortex shedding" flow meter in which a tube 92 establishes a channel 94 in which a vortex bluff 96 is located upstream from the flow meter 20. In such a configuration, the flow meter 20 measures fluid flow rate by detecting vortices shed by fluid as it flows past the vortex bluff 96 at a Reynolds number high enough to form a von Karman vortex street downstream from the vortex bluff 96. In such a flow meter, the vortex shedding rate is directly proportional to the fluid flow rate. In practice, this means that a body immersed in the flow stream receives a vibrational input at a frequency directly proportional to fluid flow rate. The most sensitive orientation for the vane 28 places the common axis 26 in a plane that is parallel to the flowing fluid so that the motion of the vane 28 is perpendicular to the flowing fluid. Oriented in this way, the signal produced by the torsion sensor 42 or by the piezo-resistors 74a–74d will have a frequency proportional to the fluid flow rate. In such an orientation, the vane 28 moves in response to vortices in the flowing fluid, but does not appreciably affect the flow of the fluid. An advantage of this orientation for the flow meter 20 is that it permits measuring flow rates in circumstances in which it would be impractical to allow the flow meter 20, including the vane 28, to impede the flow of fluid past the flow meter 20, or in which for reasons of linearity it is undesirable to allow the vane 28 to change orientation depending upon the fluid flow rate.

To avoid a large change in the magnitude of the output signal from the torsion sensor 42 or the piezo-resistors 74a–74d as a function of frequency, a flow meter 20 adapted for use as a "vortex shedding" flow meter will preferably have a resonant frequency of oscillation about the common axis 26 that is much higher than the vortex frequencies anticipated during normal operation. At frequencies above the resonant frequency of rotation of the vane 28 about the reinforcing frame 36, the output signal from the torsion sensor 42 or from the piezo-resistors 74a–74d decreases swiftly with increasing frequency; while below that resonant frequency the amplitude of the output signal remains substantially constant. However, operating the flow meter 20 in the "vortex shedding" manner reduces sensitivity of the flow rate measurement to the output signal produced by the torsion sensor 42 or from the piezo-resistors 74a–74d. Since the frequency of vortex shedding is proportional to the fluid flow rate, the frequency of the output signal from the torsion sensor 42 or from the piezo-resistors 74a–74d represents the true fluid flow rate past the flow meter 20.

This is independence of fluid flow rate from the amplitude of the output signal produced by the torsion sensor 42 or by the piezo-resistors 74a–74d is one of the fundamental advantages of the "vortex shedding" sensing orientation for the flow meter 20. The amplitude of the output signal from the torsion sensor 42 or from the piezo-resistors 74a–74d may vary significantly without adversely affecting resolution of the frequency of the output signal, i.e. the fluid flow rate. This fact permits great flexibility in the adapting the flow meter 20 to various applications. For instance, the resistance of piezo-resistors 74a–74d may vary with temperature independent of bending of the flexure hinge 72. In many applications, it is necessary to compensate the piezo-resistors 74a–74d for temperature changes or to hold the temperature constant if the amplitude of the output signal measures the fluid flow rate. In the "vortex shedding" configuration, the amplitude of the output signal is less important, since the frequency of the output signal may be measured independently of the output signal's amplitude. Consequently, in the "vortex shedding" configuration temperature variations do not significantly affect the accuracy of the flow rate measurement. Reducing or eliminating any need for temperature compensation or temperature regulation can makes a substantial difference in the cost of the system used to measure the output signal from the piezo-resistors 74a–74d.

FIGS. 10a and 10b depict a less preferred alternative embodiment of the flow meter 20 in which a central pillar 102 supports a surrounding vane. Those elements depicted in FIGS. 10a and 10b that are common to the flow meter 20 depicted in FIGS. 1a and 1b carry the same reference numeral distinguished by a sextuple prime (" '''''' ") designation. In the alternative embodiment depicted in FIG. 2, torsion bars 24'''''' extending outward from the central pillar 102 support the vane 28'''''', which surrounds the central pillar 102, for rotation about the common axis 26''''''. As illustrated in FIG., fluid flowing through the support base 52'''''', indicated by the arrows 58'''''', impinges upon the vane 28''''''. While FIGS. 10a and 10b depict the alternative embodiment flow meter 20'''''' as employing the torsion bars 24'''''' to support the vane 28'''''', it is readily apparent that the vane 28'''''' could also be supported by either of the flexure hinges 72 with their piezo-resistors 74a–74d depicted respectively in FIGS. 5a, 5b and 5c; or 6a, 6b and 6c.

FIG. 11 depicts the less preferred alternative embodiment of the flow meter 20 in which the central pillar 102 supports a surrounding vane adapted for sensing the flow rate of a larger volume flow. Those elements depicted in FIG. 11 that are common to the flow meter 20'''''' depicted in FIGS. 10a and 10b carry the same reference numeral distinguished by a septuple prime (" ''''''' ") designation. In the embodiment depicted in FIG. 11, the support base 52''''''' supports the flow meter 20''''''' within a larger diameter tube 104 that permits much of the flow to pass around the vane 28'''''''.

The flow meter 20 is not easily clogged. The area of the vane 28 can be easily varied between a few tens of square microns to a square cm or more. For a vane 28 having such a large area, the vane might be the thickness of the wafer as described in the patent application and patent identified above. The thickness of the torsion bars 24 is established by the thickness of the top SOI layer, and the width and length of the torsion bars 24 may range from a few microns to several hundred microns, depending upon flow rate to be sensed. The flow meter 20 may have a thickness "t," indicated by a double headed arrow 106 in FIG. 5b, ranges between 50 and 500 microns, but more commonly is between 100 microns and 500 microns. The thickness of the flow meter 20 may be as little as 1.0 mm, even less if so desired. The thickness of the vane 28 may equal that of the torsion bars 24 (i.e. the upper silicon layer of the SOI substrate), the full wafer thickness, or may alternatively be formed as the reinforcing frame 36, which provides stiffness, yet lowers the mass of the vane 28.

Although the present invention has been described in terms of the presently preferred embodiment, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A micromachined vane flow meter adapted for use in sensing a rate at which a fluid flows through the flow meter, the flow meter comprising:

a support;

two opposing torsion bars that are aligned along a common axis, and which project from said support;

a vane that is joined to and supported from said support by said torsion bars that dispose said vane in a rest position while no external force is applied to said vane, said vane being supported by the torsion bars in the rest position for rotation about the common axis of the torsion bars by a force applied to said vane thereby imposing a shear stress on said torsion bars; and deflection sensing means for sensing deflection of said vane from the rest position by fluid impinging upon and flowing around said vane; said support, torsion bars, vane and deflection sensing means all being monolithically fabricated in a semiconductor single-crystal silicon layer of a substrate.

2. The flow meter of claim 1 wherein said deflection sensing means is disposed on at least one of said torsion bars for generating a torsion signal that indicates deflection of said vane from the rest position.

3. The flow meter of claim 2 wherein said deflection sensing means comprises:

at least four electrical ohmic contacts with a pair of said ohmic contacts being disposed along a line that is substantially parallel to the axis of the torsion bar; and means for applying an electric current across a first pair of said ohmic contacts while the torsion signal is sensed from a second pair of said ohmic contacts that are oriented perpendicularly to a line joining the first pair of said ohmic contacts.

4. The flow meter of claim 3 wherein alternating current ("AC") is applied across the pair of ohmic contacts whereby the torsion signal becomes a modulation envelope of the AC.

5. The flow meter of claim 1 wherein said substrate is a silicon material which has both a |100| crystallographic direction and a |110| crystallographic direction, and said torsion bars are oriented along the |110| crystallographic direction for an n-type silicon layer.

6. The flow meter of claim 1 wherein said semiconductor substrate is a silicon material which has both a |100| crystallographic direction and a |100| crystallographic direction, and said torsion bars are oriented in the |100| crystallographic direction for a p-type silicon layer.

7. The flow meter of claim 1 wherein said single crystal-silicon layer is in a Simox wafer.

8. The flow meter of claim 1 wherein said single crystal-silicon layer is in a silicon-on-insulator wafer.

9. The flow meter of claim 1 wherein rounded corners join said torsion bars to said support.

10. The flow meter of claim 1 wherein rounded corners join said torsion bars to said vane.

11. The flow meter of claim 1 wherein said torsion bars have a surface layer of silicon carbide or silicon nitride formed thereon.

12. The flow meter of claim 1 wherein said support is frame-shaped and encircles said vane.

13. The flow meter of claim 1 wherein the vane is substantially thinner than the support.

14. The flow meter of claim 1 wherein mass around the center of said vane is mostly etched away.

15. The flow meter of claim 1 wherein mass around the center of said vane is completely etched away whereby said vane has a frame-shape.

* * * * *